July 22, 1958  C. C. HUTCHINS ET AL  2,844,748

SYNCHRONOUS MOTOR ROTOR CONDUCTOR BAR CONSTRUCTION

Filed April 12, 1955

*INVENTORS*
CHARLES C. HUTCHINS
& BLAIR C. SEAMAN
BY

ATTORNEYS

United States Patent Office 2,844,748
Patented July 22, 1958

2,844,748

SYNCHRONOUS MOTOR ROTOR CONDUCTOR BAR CONSTRUCTION

Charles C. Hutchins and Blair C. Seaman, Ridgway, Pa., assignors to The Electric Products Company, Cleveland, Ohio, a corporation of Ohio Application April 12, 1955, Serial No. 500,919

8 Claims. (Cl. 310—183)

This invention relates to synchronous motor construction and, more particularly, to motors of the salient pole synchronous type employing amortisseur or squirrel cage windings located in the pole faces for providing starting torque.

It is a well known practice to employ, as means for starting synchronous motors, induction type cage rotor constructions in the poles of a salient pole machine. The conductor bars may be in a single or double row and may be of various conventional shapes and of various conventional conductive materials such as brass, copper or the like. In induction motors of this type a relatively high resistance rotor cage produces a relatively high starting torque whereas a relatively low resistance rotor cage produces a relatively low starting torque. On the other hand, the relatively high rotor resistance gives, when the induction motor is runing at normal operating speeds, a relatively high degree of slip from synchronous speed, whereas a rotor having relatively low resistance provides a rotor having relatively low slip at running speeds.

It is an object of this invention to provide a rotor construction in the salient poles of a synchronous motor which provides a relatively high resistance rotor upon motor starting, thus giving rise to relatively high starting torque, and at the same time to provide a rotor cage having relatively low resistance at normal operating speeds, thus providing a rotor which will have low slip characteristics at running speed and will provide in conjunction with the synchronous windings a motor having good pull-in characteristics.

It has been recognized that if deep narrow conductor bars are employed in the pole faces, there will arise an eddy current effect by means of which the current passing through each conductor bar will tend to crowd toward the top portion of the bar when the frequency of the current is high. An induction motor at standstill having sixty cycle potential impressed thereon has rotor currents having a frequency of sixty cycles. This frequency decreases with speed. Thus, as the motor comes up to speed, the eddy current effect is reduced and the current spreads out more uniformly through the entire cross-section of the deep conductor and, therefore, the conductor resistance appears to decrease with speed. It has similarly been noted that the conductor reactance decreases with speed in view of the decreasing frequency of the current flowing in the conductor. These observations have led to various attempts at deepening the pole head to allow for the employing of deep conductor bars therein above the synchronous motor pole winding carried by the pole below the head portion thereof. This construction has been found to be ineffective, however, primarily for the reason that magnetic leakage between the poles increases substantially with increase of pole head depth and thus any gain which was obtained by the deepened conductors was substantially offset by the increased magnetic leakage.

We have found that during periods of motor starting when high rotor slip values are involved the pole horn conductor bars are most effective in providing torque. The term "pole horn" is used to refer to the leading and trailing portions of the pole head which overlap the pole winding and the term is used to distinguish this portion of the pole head from the central portion of the pole head lying adjacent to either side of the pole longitudinal center line with respect to the direction of rotation of the pole. We have also found that the most effective conductor bars when the motor is approaching synchronous speed are the bars in the central portion of the pole. This is probably for the reason that the pole horn bars span the most flux, have the highest voltage induced and circulate the most current upon starting whereas, as the motor approaches synchronizing speed, the central bars which are usually larger gain current faster than the horn bars as the frequency effect in the whole cage diminishes and leaves resistance as the largest governing factor.

These determinations have led to the construction of a cage in which the pole horn bars are of shallow depth and the central bars are deep bars extending down into the body of the pole to an extent which may actually be below the outermost edge of the pole winding. This construction provides for relatively small high resistance conductor bars in the horn area and provides, as a result of the eddy current effect in the deep conductor bars in the central area of the pole, relatively high resistance in these bars upon motor starting. It will be evident from the foregoing that the same structure provides bars in the central area which, as the motor increases in speed, have a relatively low effective resistance and, in view of the fact that these bars are the most effective bars at higher speeds, the decrease in overall rotor cage resistance as rotor speed increases is greater than would otherwise be expected. This construction additionally permits the use of shallow pole horns resulting in small magnetic leakage between poles.

A structure providing for attainment of the foregoing objects and considerations will now be described in conjunction with the accompanying drawings, in which.

Figure 1:
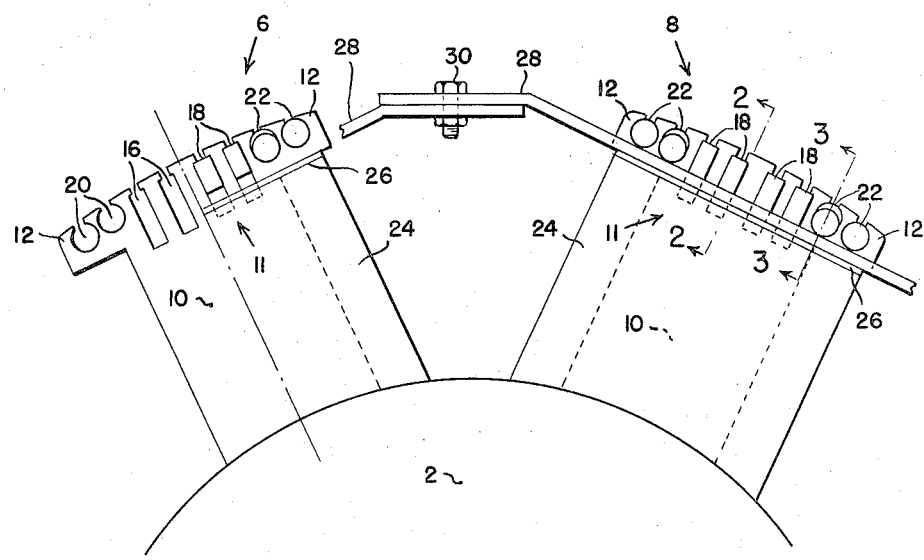
Figure 1 is a partially cut-away fragmentary elevation of a synchronous motor rotor showing two poles thereof.

In Figure 1 there is shown a fragmentary elevation of a motor rotor including a rotor hub portion 2 on which there is mounted a plurality of poles including the poles indicated at 6 and 8 in the figure.

Each of the poles includes a body portion 10 and a pole head portion 11 having pole horns 12. In the central portion of the pole head there are provided slots 16 for the reception of deep conductor bars 18 and in the horn portions of the pole head there are provided shallow slots 20 for the reception of conductor bars 22. A synchronous motor pole coil 24 is wound around the pole body portion 10 and is held in position in part by the pole horns 12 which bear against a layer of insulating material 26 which is positioned over the windings 24 in order to protect the windings.

Figure 2:
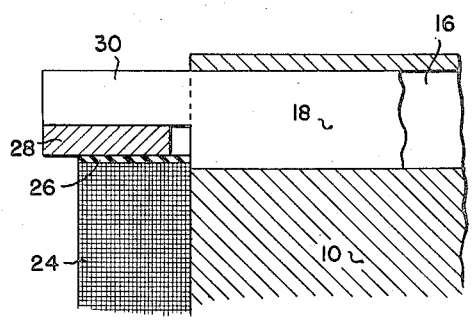
Figure 2 is a fragmentary section through a pole taken on the trace 2—2 shown in Figure 1.
Figure 3:
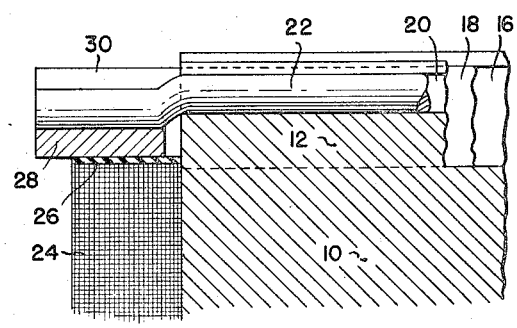
Figure 3 is a fragmentary section of a pole taken on the trace 3—3 shown in Figure 1.

The longitudinally extending conductor bars 18 and 22 are of approximately the same width and are connected at their ends to transversely extending collector bars 28 which are identical for each pole and are connected together between poles as indicated at 30 in Figure 2. The shallow bars 22 extend outwardly from the pole and have their lower or inner surfaces soldered or otherwise suitably secured in an electrically conductive manner to the collector bar 28. The deep bars 18 are cut away for the portion 30 thereof, as best shown in Figure 2, which extends beyond the pole itself and outwardly over the collector bar 28. This portion of the bar 18 is also soldered or otherwise suitably electrically connected to the collector bar 28. It will be noted that the length of the reduced depth portion 30 of the deep bars 18 through which the bar is not connected to the collector bar 28 is relatively short and thus the added resistance value of this short reduced section length is substantially inconsequential.

The collector bar 28 also bears against the insulating plate 26 and thus provides an additional function of supporting the synchronous motor pole coil 24 at the sides of the pole 10.

As is best shown in Figures 1 and 2, the deep rotor bars 18, which are the central bars of the pole, extend downwardly in the pole to a depth which may be, if desired, substantially below the outermost portion of the coil. In view of the fact that the deep bars 18 are of relatively narrow construction, the eddy current effect previously referred to, which serves to crowd the current to the top or outer portion of the conductor during motor starting, effectively reduces the conductor bar to a small or high resistance conductor bar during motor starting, whereas as the motor speed increases and the frequency of the conductor bar currents decreases a more uniform current distribution exists in these deep conductor bars and the conductor bars become effectively low resistance bars.

Figure 4:
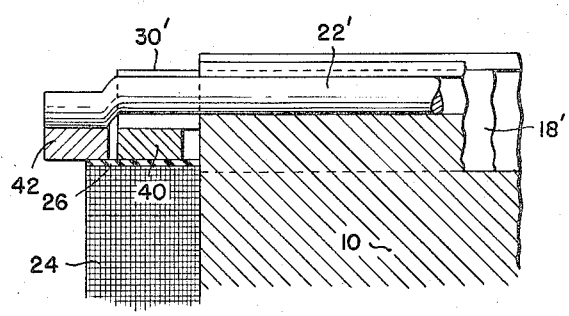
Figure 4 is a view similar to that shown in Figure 3 showing a modification of the invention.

As previously noted, the pole horn bars 22 are the most effective bars in providing starting torque whereas the central bars in the pole are the most effective bars in providing pull-in torque as the rotor approaches synchronous speed. In order to further increase the resistance of the cage at the time of motor starting, it is sometimes desirable to form the small conductor bars 22 of a material having higher electrical resistance than that from which the deep conductor bars in the central portion of the pole are formed. This type of construction which is shown in Figure 4 may employ, for example, copper deep conductor bars 18' which have their reduced depth end portions 30' affixed to a copper collector bar 40 and small pole horn conductor bars which may be formed, for example, of bronze or brass affixed to a second collector bar 42 which is formed of the same material as is the conductor bar 22'. In this construction the pole horn 10, the synchronous motor pole winding 24 and the slot arrangement may be identical with what is shown in Figure 1. The two collector bars 40 and 42 are preferably employed in order that the expansion of each of the collector bars and associated conductor bars are identical. Thus the creation of stresses resulting from temperature change conditions during motor operation is avoided. The collector bars 40 and 42 of adjacent poles are connected together between poles in the manner of the collector bars 28 shown in Figure 2 and the collector bars 40 and 42 are also preferably joined together at this location.

From the foregoing it will be evident that the structure disclosed herein allows the use of minimum pole horn depth and thus minimizes flux linkage between the poles while permitting the simultatneous use of conductor bars having deep sections. The overall construction provides good mechanical sections and good coil support and thus provides a rotor structure having high mechanical strength. These various features are involved in conjunction with the relatively high rotor resistance upon starting required to give rise to relatively high starting torque and, at the same time, a relatively low rotor resistance at high rotor speeds giving rise to relatively high pull-in torques, i. e., a relatively high induction motor running speed or, stated otherwise, a relatively small degree of slip through which the rotor must be accelerated when the synchronous motor field coil windings are energized to cause the motor to step into synchronism and operate as a synchronous motor. It will be evident that this structure provides for highly effective utilization of squirrel cage winding materials at all points along the motor speed torque curve. This is particularly important in motors of large size such as motors ranging from 50 to 10,000 horse power in which reduction in motor size and the saving in material costs resulting therefrom is substantial.

What is claimed is:

1. Synchronous motor salient pole construction comprising a pole member having a body portion adapted to be encircled by a pole winding and having a head portion of greater transverse dimension than the body portion and extending over the pole winding on the pole body, the pole head portion being formed with longitudinally extending slots for the reception of cage conductor bars, and the slots in the region of the pole head overlying the pole body extending downwardly into the pole body.

2. Synchronous motor salient pole construction comprising a pole member having a body portion adapted to be encircled by a pole winding and having a head portion of greater transverse dimension than the body portion and extending over the pole winding on the pole body, the pole head portion being formed with longitudinally extending slots for the reception of cage conductor bars, and the slots in the region of the pole head overlying the pole body extending downwardly into the pole body while being of substantially the same width as the slots in the region of the pole head extending beyond the pole body.

3. Synchronous motor salient pole construction comprising a plurality of pole members each having a pole body adapted to be encircled by a pole winding and having a pole head including a central portion overlying the pole body and transversely outwardly extending pole horns overlying the pole winding, longitudinally extending slots in each pole head, the slots in the central portion of each pole head extending downwardly into the pole body, conductor bars substantially filling the slots of each of said pole members and having end portions extending outwardly beyond the pole members over the pole windings, and a collector bar extending transversely of the conductor bars, connected to the end portions of the conductor bars of each of said pole members and lying over the pole windings, the deep central conductor bars having reduced depth end portions connected to the collector bar.

4. Synchronous motor salient pole construction comprising a plurality of pole members each having a pole body adapted to be encircled by a pole winding and having a pole head including a central portion overlying the pole body and transversely outwardly extending pole horns overlying the pole winding, longitudinally extending slots in each pole head, the slots in the central portion of each pole head extending downwardly into the pole body, conductor bars substantially filling the slots of each of said pole members and having end portions extending outwardly beyond the pole members over the pole windings, and a collector bar extending transversely of the conductor bars, connected to the end portions of the conductor bars of each of said pole members and lying over and supporting the pole windings, the deep central conductor bars having reduced depth end portions connected to the collector bar.

5. Induction start synchronous motor salient pole construction comprising a pole member having a pole body adapted to be encircled by a pole winding and having a pole head including a central portion overlying the pole body and transversely outwardly extending pole horns overlying the pole winding, longitudinally extending slots in the radially outer face of the pole head, a plurality of slots in the central portion of the pole head being of greater depth than width and of approximately twice the depth of from the pole face as the slots in the pole horns, and individual conductor bars substantially filling each of the slots and having end portions extending outwardly beyond the pole member over the pole winding for connection to collector bars extending between poles.

6. Induction start synchronous motor salient pole construction comprising a pole member having a pole body adapted to be encircled by a pole winding and having a pole head including a central portion overlying the pole body and transversely outwardly extending pole horns overlying the pole winding, longitudinally extending slots in the radially outer face of the pole head, a plurality of slots in the central portion of the pole head being of approximately the same width and of approximately twice the depth from the pole face as the slots in the pole horns, and individual conductor bars substantially filling each of the slots and having end portions extending outwardly beyond the pole member over the pole winding for connection to collector bars extending between poles.

7. Induction start synchronous motor salient pole construction comprising a pole member having a pole body adapted to be encircled by a pole winding and having a pole head including a central portion overlying the pole body and transversely outwardly extending pole horns overlying the pole winding, longitudinally extending slots in the radially outer face of the pole head, a plurality of slots in the central portion of the pole head being of greater depth than width and of approximately twice the depth from the pole face as the slots in the pole horns, individual conductor bars substantially filling each of the slots and having end portions extending outwardly beyond the pole member over the pole winding for connection to collector bars extending between poles, the conductor bars in the deep central slots being formed of a more highly conductive material than the conductor bars in the relatively shallow pole horn slots, and a pair of collector bars extending transversely of the conductor bars and lying over the pole winding, one of the collector bars being formed of the same material as the central conductor bars and being connected thereto and the other of the collector bars being formed of the same material as the pole horn conductor bars and being connected thereto.

8. Apparatus in accordance with claim 7 in which the deep central conductor bars extend below the outer end of the coil and have reduced depth end portions extending outwardly over the coil and connected to their associated collector bar.

References Cited in the file of this patent
UNITED STATES PATENTS

| | | |
|---|---|---|
| 899,447 | Field | Sept. 22, 1908 |
| 1,495,969 | Alexanderson | May 27, 1924 |
| 1,870,776 | Johns | Aug. 9, 1932 |
| 1,890,344 | Taylor | Dec. 6, 1932 |
| 2,087,406 | Hutchins | July 20, 1937 |
| 2,261,039 | Shutt et al. | Oct. 28, 1941 |
| 2,456,983 | Morse | Dec. 21, 1948 |

FOREIGN PATENTS

| | | |
|---|---|---|
| 236,854 | Germany | July 13, 1911 |
| 847,617 | Germany | Aug. 25, 1952 |
| 857,231 | Germany | Nov. 27, 1952 |